United States Patent [19]

Kuriyama

[11] Patent Number: 5,608,601
[45] Date of Patent: Mar. 4, 1997

[54] CAPACITOR ELEMENT FOR SOLID ELECTROLYTIC CAPACITOR

[75] Inventor: Chojiro Kuriyama, Ukyo-ku, Japan

[73] Assignee: Rohm Co., Ltd., Kyoto, Japan

[21] Appl. No.: 427,258

[22] Filed: Apr. 24, 1995

Related U.S. Application Data

[62] Division of Ser. No. 224,556, Apr. 7, 1994, Pat. No. 5,461,538.

[30] Foreign Application Priority Data

Jul. 9, 1993 [JP] Japan .................................. 5-170632
Nov. 24, 1993 [JP] Japan .................................. 5-293210

[51] Int. Cl.$^6$ .................................................. H01G 9/048
[52] U.S. Cl. .................... 361/532; 361/523; 361/528; 361/529; 361/540
[58] Field of Search .............................. 361/517–521, 361/535–539, 523, 528–529, 532–534, 540; 29/25.03

[56] References Cited

U.S. PATENT DOCUMENTS 1,893,996  1/1933  Kershner .
3,345,545  10/1967  Bourgault et al. .......................... 361/529
3,530,342  9/1970  Klein .
4,162,518  7/1979  Curlis .......................................... 361/528

FOREIGN PATENT DOCUMENTS

3832368  3/1990  Germany .
3931251  3/1991  Germany .
4111074  10/1991  Germany .
60-220922  11/1985  Japan .
2-105513  4/1990  Japan .
2-69923  8/1990  Japan .

*Primary Examiner*—Bot L. Ledynh
*Attorney, Agent, or Firm*—William H. Eilberg

[57] ABSTRACT

A capacitor element for a solid electrolytic capacitor is provided which comprises a sintered chip of metal powder, the chip having a first end and a second end opposite to the first end. The chip includes a tapered body whose cross-sectional area reduces from the first end to the second end, and a cathode layer covering the chip excepting at least the first end.

4 Claims, 9 Drawing Sheets

CAPACITOR ELEMENT FOR SOLID ELECTROLYTIC CAPACITOR

This is a division of Ser. No. 224,556, filed on Apr. 7, 1994, now U.S. Pat. No. 5,461,538.

BACKGROUND OF THE INVENTION

1. Field of the Invention

This invention relates to a capacitor element which is used for constituting a solid electrolytic capacitor such as tantalum capacitor or aluminum capacitor. The present invention also relates to a compacting device and method used for making such a capacitor element.

2. Description of the Prior Art

For conveniently explaining the problems to be solved by the present invention, reference is made to FIGS. 17 through 28 of the accompanying drawings.

Figure 17:
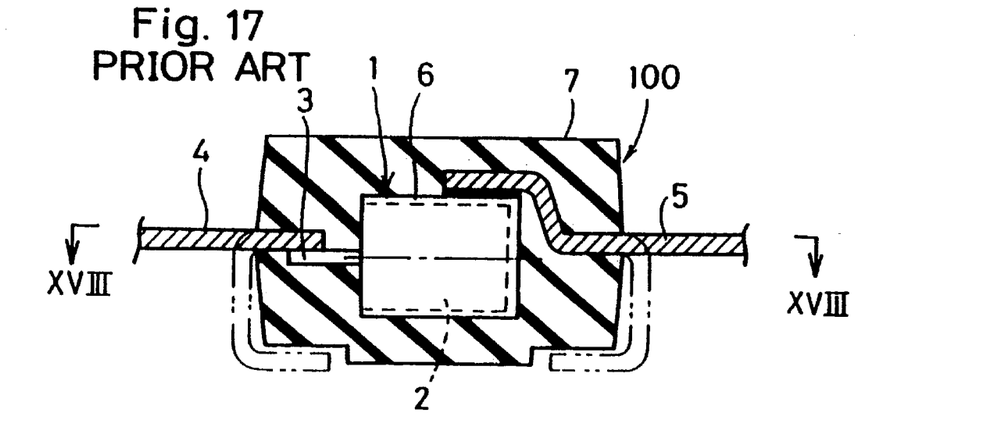
FIG. 17 is a front view, in vertical section, showing a prior art package-type solid electrolic capacitor.
Figure 18:
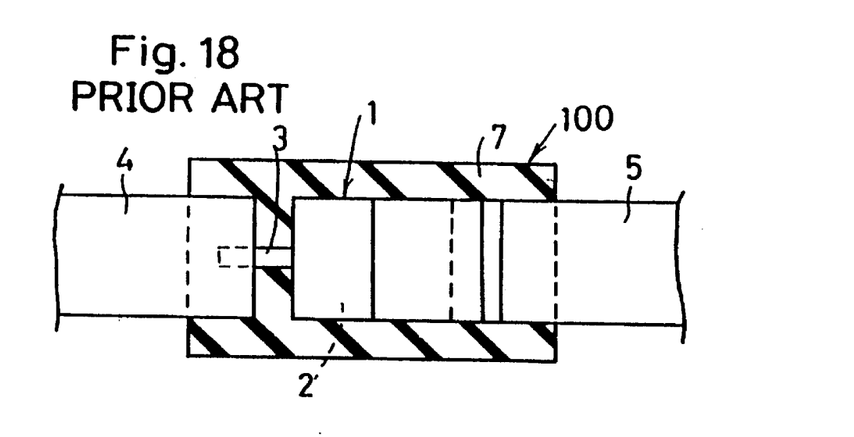
FIG. 18 is a sectional view taken along lines XVIII—XVIII in FIG. 17.

FIGS. 17 and 18 show a typical prior art solid electrolytic capacitor 100. Such a capacitor is called a package-type capacitor and disclosed in Japanese Patent Application laid-open No. 60(1985)-220922 for example.

Specifically, the prior art capacitor 100 comprises a capacitor element 1 which includes a sintered porous chip 2 and an anode wire 3 projecting from one end of the chip 2. The chip 2 is covered by a cathode layer 6 paired with the anode wire 3. The anode wire 3 is connected to an anode lead 4 by welding for example, whereas the cathode layer 6 is electrically connected directly to a cathode lead 5. Further, a resin package 7 is formed to enclose the capacitor element 1 together with part of the anode and cathode leads 4, 5. The portions of the respective leads 2, 5 projecting from the package 7 may be bent toward the underside of the package 7 for conveniently mounting onto a surface of a circuit board (not shown), as indicated by phantom lines in FIG. 17.

Figure 19:
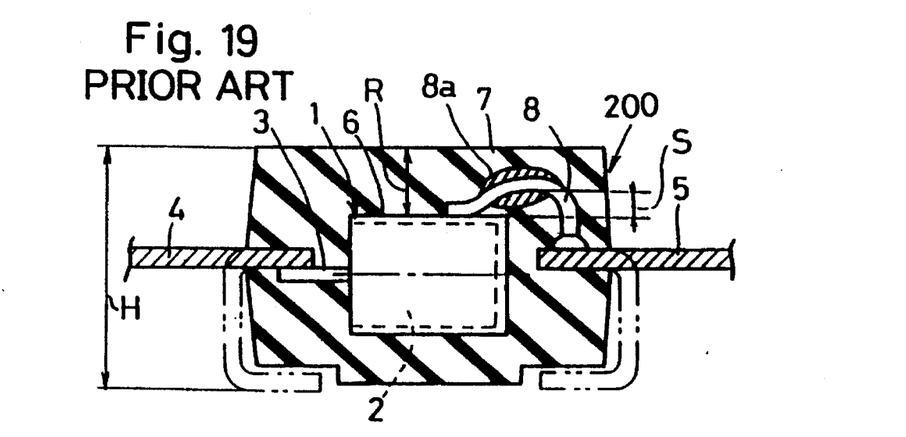
FIG. 19 is a sectional view similar to FIG. 17 but showing another prior art package-type solid electrolic capacitor.

FIG. 19 shows another prior art solid electrolytic capacitor 200 which is similar to the one illustrated in FIGS. 17 and 18 but differs therefrom mainly in that the cathode layer 6 is electrically connected to the cathode lead 5 indirectly via a safety fuse 8 which may be an overcurrent fuse or a temperature fuse. Further, the fuse 8 may be partially enclosed in an arc-extinguishing resin member 8a. Such a capacitor is disclosed in Japanese Patent Application Laid-open No. 2(1990)-105513 for example.

In either one of the prior art capacitors 100, 200, the capacitor element 1 is produced in the following manner.

Figure 26:
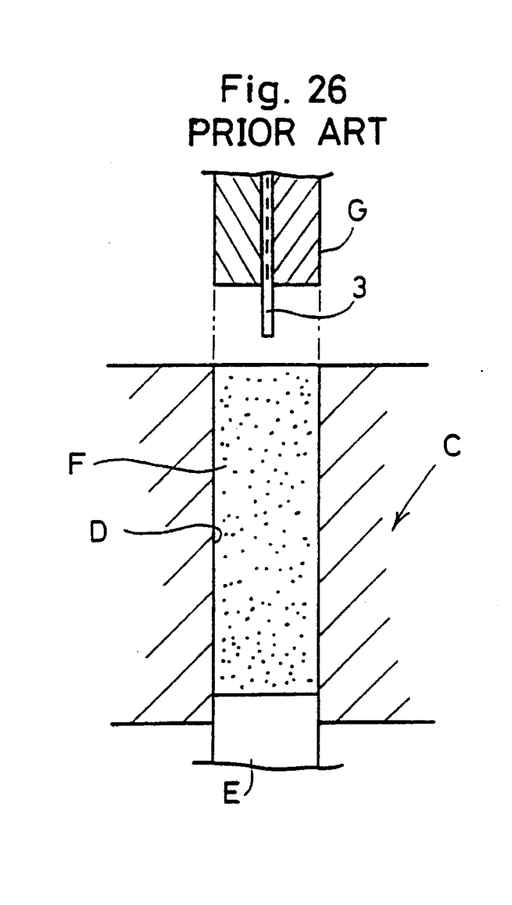
FIG. 26 to 28 are views, in vertical section, showing successive steps of forming the chip shown in FIG. 20.
Figure 27:
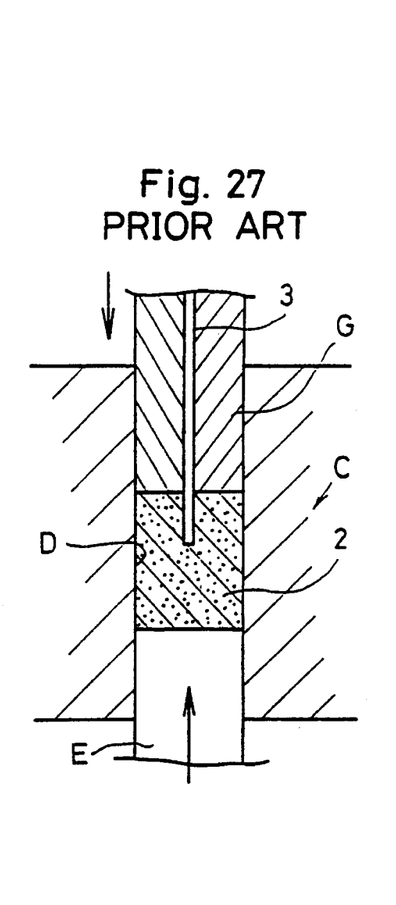
Figure 28:
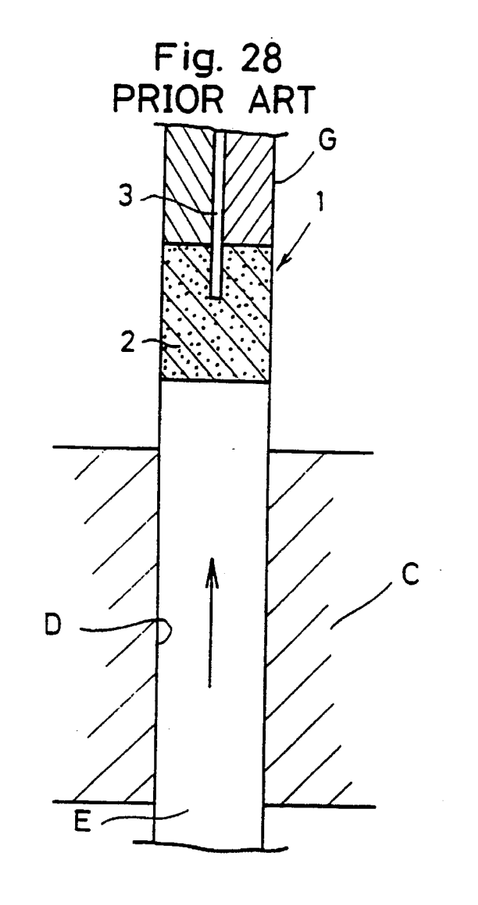

Specifically, use is made of a compacting device, as shown in FIGS. 26 to 28. The compacting device comprises a form C having a shaping bore D of an entirely constant cross-sectional area, a lower die E, and an upper die G. Both of the dies E, G are vertically movable into and out of the shaping bore 12 of the form 11. Further, the upper die G is designed to removably hold an anode wire 3.

For compacting, a predetermined amount of metal powder (e.g. tantalum particles) F is loaded into the shaping bore D of the form C with the lower die E slightly inserted into the shaping bore D from below, as shown in FIG. 26.

Then, as shown in FIG. 27, the upper die G holding the anode wire 3 is inserted downwardly into the shaping bore D, whereas the lower die E is further advanced upwardly. As a result, the metal powder is compacted into a porous chip 2 with the anode wire 3 partially inserted in and partially projecting from the chip 2.

Figure 20:
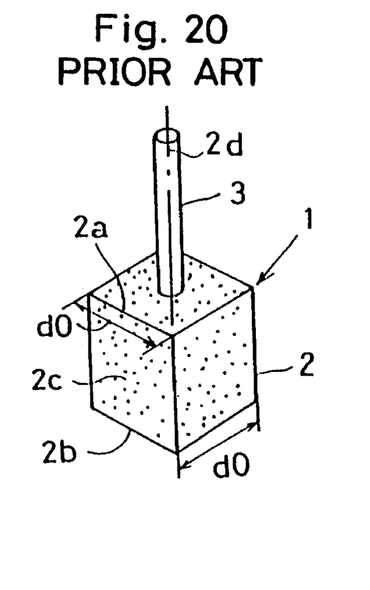
FIG. 20 is a perspective view showing a capacitor element used in the prior art package-type solid electrolytic capacitor of FIG. 17 or 19.

Then, as shown in FIG. 28, the upper die G is drawn upwardly out of the shaping bore D while the lower die E is additionally advanced upwardly past the shaping bore D. As a result, the chip 2 is pushed out of the shaping bore D. The chip 2 may have a square cross section of a side length d0 which is entirely constant from a top surface 2a to a bottom surface 2b, as shown in FIG. 20. The side surfaces 2c of the chip 2 are therefore parallel to a central longitudinal axis 2d of the chip 2 along which the anode wire 3 extends.

Figure 21:
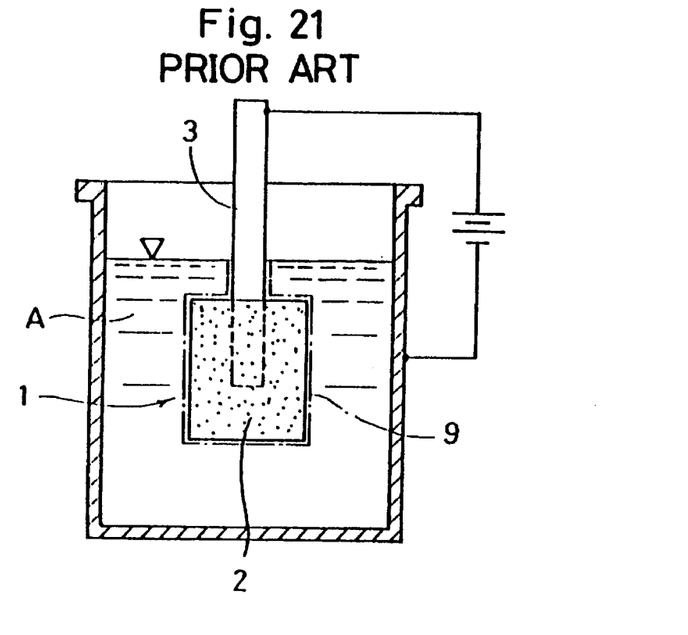
FIG. 21 is a view, in vertical section, showing the capacitor element of FIG. 20 which is undergoing the step of performing dielectric coating.

The porous chip 2 thus obtained is then subjected to sintering. Further, as shown in FIG. 21, the sintered chip 2 together with a root portion of the anode wire 3 is immersed in an aqueous solution A of phosphoric acid and subjected to anodic oxidation (electrolytic oxidation) by applying a direct current. As a result, a dielectric coating (made of e.g. tantalum pentoxide) is formed on the surfaces of the metal particles and on the immersed root portion of the anode wire 3. In FIG. 21, only the exposed portion of the dielectric coating is schematically represented by reference numeral 9 in an exaggerated manner for purposes of illustration.

Figure 22:
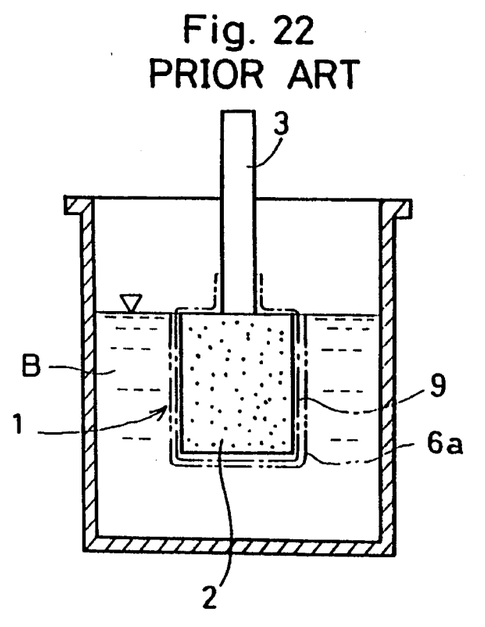
FIG. 22 is a view, in vertical section, showing the capacitor element of FIG. 20 which is undergoing the step of performing solid electrolyte formation.

Then, as shown in FIG. 22, the dielectrically coated chip 2 is immersed in an aqueous solution B of manganese nitrate to cause permeation of the solution into the porous chip portion, and thereafter taken out of the solution for baking. This step is repeated plural times to fill the inner voids or porous of the chip 2 with a solid electrolyte (e.g. manganese dioxide) while also forming an exposed solid electrolyte layer 6a over the exposed dielectric coating 4. It should be appreciated that a combination of some cathode side layers is shown as the single cathode layer 6 only for the convenience of illustration.

Figure 23:
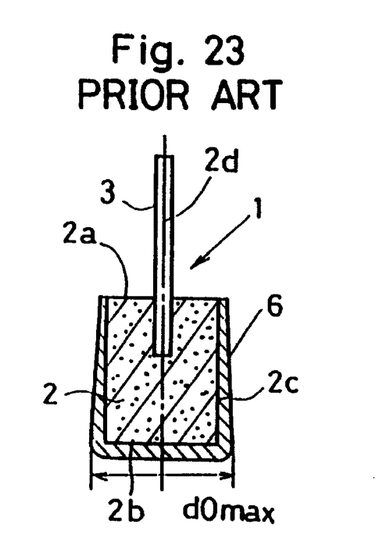
FIG. 23 is a view, in vertical section, showing the capacitor element of FIG. 20 after forming a cathode layer.

Then, as shown in FIG. 23, a metallic cathode layer 6 (made of silver or nickel for example) is formed to cover the bottom surface 2b and side surfaces 2c of the chip 2 usually with an intervening layer (e.g. graphite layer) interposed between the cathode layer 6 and the electrolyte layer. It should be appreciated that a combination of the cathode side layers (including the electrolyte layer 6a, the cathode layer 6, and etc.) is shown as the single cathode layer only for the convenience of illustration.

The prior art described above has been found to be disadvantageous in the following respects.

When the cross-section or outer dimension d0 of the chip 2 is rendered constant over the entire length of the chip (FIG. 20), the cathode layer 6 has a tendency to flare downward, as shown in FIG. 23. Such a tendency is attributable to the fact that a portion of the manganese nitrate solution deposited on the chip 2 tends to gravitationally move downward at the time of drying the deposited solution for forming the solid electrolyte layer 6a. Thus, a maximum outer dimension d0max will result at the bottom 2b of the chip 2.

Figure 24:
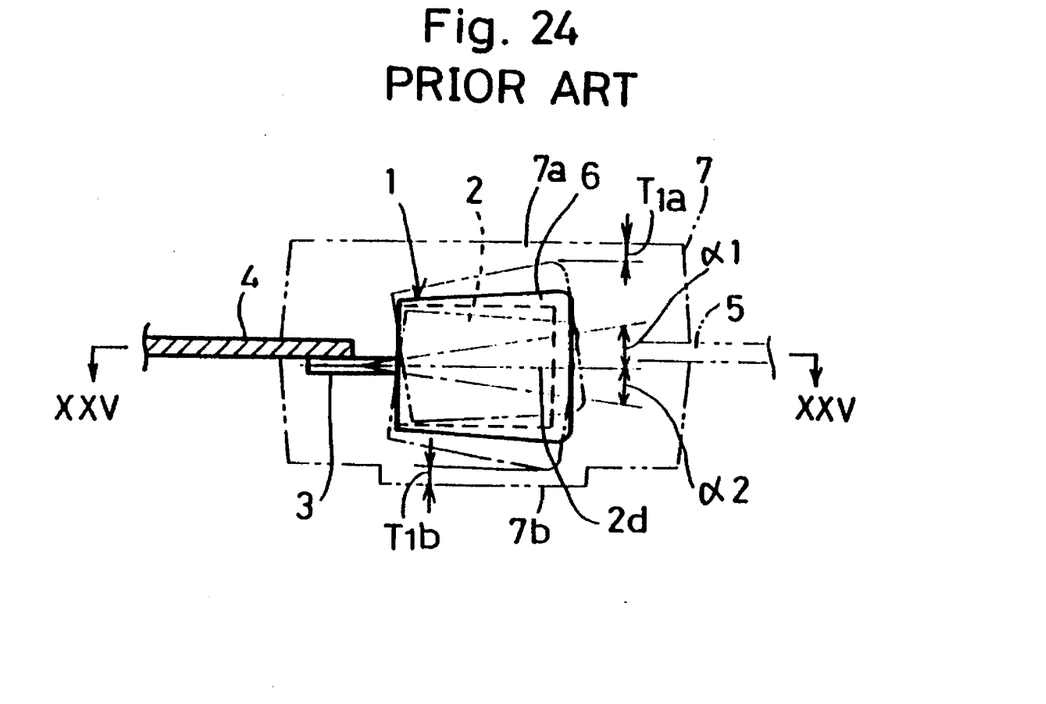
Figure 25:
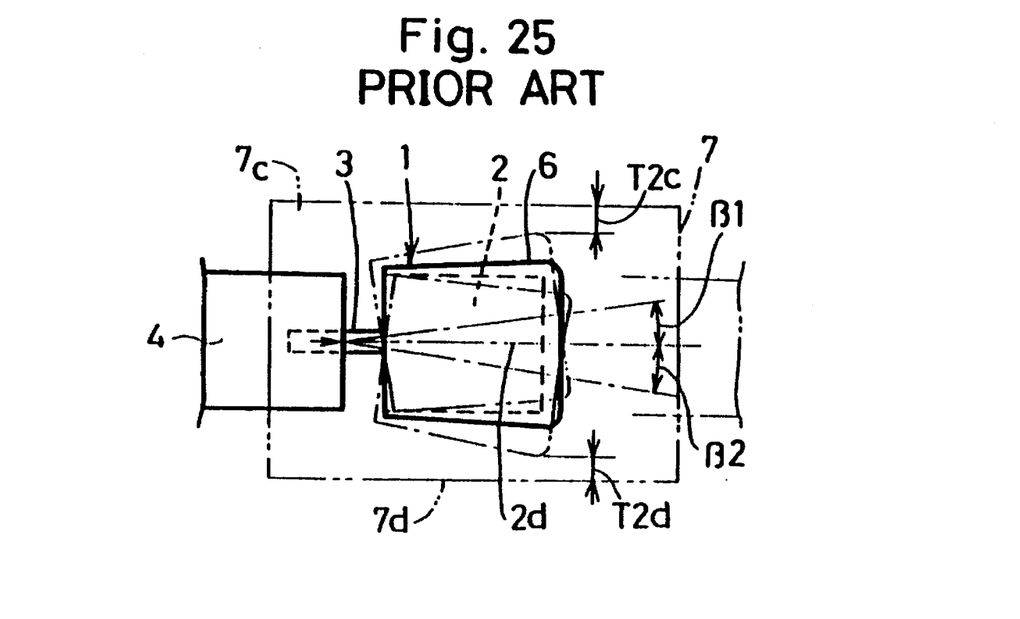
FIG. 25 is a plan view of the packaged capacitor element as seen in the direction of arrows XXV—XXV in FIG. 24.

On the other hand, it has been found that the anode wire 3 is liable to bending at the time of connecting to the anode lead 4, so that the central longitudinal axis 2d of the chip 2 may be inclined upwardly or downwardly by an angle $\alpha 1$ or $\alpha 2$ (FIG. 24), and/or laterally by an angle $\beta 1$ or $\beta 2$ (FIG. 25). Thus, if the cathode layer 6 flares in a direction away from the anode wire 3, the minimum wall thickness T1a, T1b, T2c or T2d of the resin package 7 at either of the four sides of the capacitor element 1 (i.e., four side surfaces 7a, 7b, 7c, 7d of the resin package 7) may become unacceptably small, resulting in a rejectable product. Otherwise, the volume of the chip 2 must be reduced, thereby hindering an increase of the realizable capacitance.

Due to the constant cross section of the chip 2 (see FIG. 20), the cross section of the shaping bore D (see FIGS. 26–28) is also made constant over the entire length thereof. Thus, when pushed out of the shaping bore D after compacting, the porous chip 2 is inevitably rubbed against the shaping bore D which may be rough-surfaced. As a result, the surfaces of the porous chip 17 may be clogged up by such rubbing, thereby hindering permeation of the maganese nitrate solution B (see FIG. 22) into the porous chip 2 or expelling of inside gases at the time of electrolyte formation. Further, the rubbing between the chip 2 and the shaping bore D is also disadvantageous in that the form C is easily damaged to shorten its own service life.

Moreover, since the degree of the rubbing increases as the degree of compaction increases, it has been conventionally difficult to increase the degree of compaction which is required for increasing the realizable capacitance of the product.

SUMMARY OF THE INVENTION

It is, therefore, an object of the present invention to provide a capacitor element for a solid electrolytic capacitor which can eliminate or reduce the above-described disadvantages of the prior art.

The present invention also seeks to provide a compacting device which is suitably usable for making such a capacitor element.

The present invention further seeks to provide a method for suitably making such a capacitor element.

According to one aspect of the present invention, there is provided a capacitor element for a solid electrolytic capacitor comprising: a sintered chip of metal powder, the chip having a first end and a second end opposite to the first end, the chip including a tapered body whose cross-sectional area reduces from the first end to the second end; and a cathode layer covering the chip excepting at least the first end. The capacitor element may further comprise an anode wire projecting from the first end of the chip.

Preferably, the tapered body of the chip has a taper angle which is set so that a combined body of the chip and the cathode layer also reduces cross-sectionally from the first end to the second end. Further preferably, the chip may have a chambered portion between the tapered body and the second end, and the capacitor element may be further made to comprise an insulating resin layer formed to cover the cathode layer at the second end and the chambered portion.

According to a preferred embodiment of the present invention, the first end of the chip is rendered cross-sectionally constant for a predetermined length. Similarly, the second end of the chip may be rendered cross-sectionally constant for a predetermined length.

According to another aspect of the present invention, there is provided a compacting device for making a capacitor element, the device comprising: a form having a shaping bore which includes a cross-sectionally larger inserting portion, a cross-sectionally smaller inserting portion, and a tapered intermediate portion between the larger and smaller inserting portions, the tapered intermediate portion cross-sectionally reducing from the larger inserting portion toward the smaller inserting portion; a first die withdrawably insertable into the smaller inserting portion of the shaping bore; and a second die withdrawably insertable into the larger inserting portion of the shaping bore.

According to a further aspect of the present invention, there is provided a method of making a capacitor element by using a compacting device which comprises: a form having a shaping bore which includes a cross-sectionally larger inserting portion, a cross-sectionally smaller inserting portion, and a tapered intermediate portion between the larger and smaller inserting portions, the tapered intermediate portion cross-sectionally reducing from the larger inserting portion toward the smaller inserting portion; a first die withdrawably insertable into the smaller inserting portion of the shaping bore; and a second die withdrawably insertable into the larger inserting portion of the shaping bore; the method comprising the steps: partially inserting the first die into the smaller inserting portion of the shaping bore; loading a predetermined amount of metal powder into the shaping bore; compacting the metal powder into a porous chip in the tapered intermediate portion of the shaping bore by inserting the second die into the larger inserting portion of the shaping bore while further advancing the first die in the smaller inserting portion of the shaping bore; and taking out the compacted porous chip by withdrawing the second die out of the shaping bore while additionally advancing the first die past the larger inserting portion.

Other objects, features and advantages of the present invention will be fully understood from the following detailed description given with reference to the accompanying drawings.

BRIEF DESCRIPTION OF THE DRAWINGS

In the accompanying drawings:

FIG. 22 is a front view, partially in section, showing the capacitor element of FIG. 23 as enclosed in a resin package;

DETAILED DESCRIPTION OF THE PREFERRED EMBODIMENTS

FIGS. 1 through 8 of the accompanying drawings illustrate successive steps of making a solid electrolytic capacitor according to a first embodiment of the present invention. The capacitor may be a tantalum capacitor or an aluminum capacitor for example. The capacitor of the first embodiment is made by using a compacting device.

Figure 1:
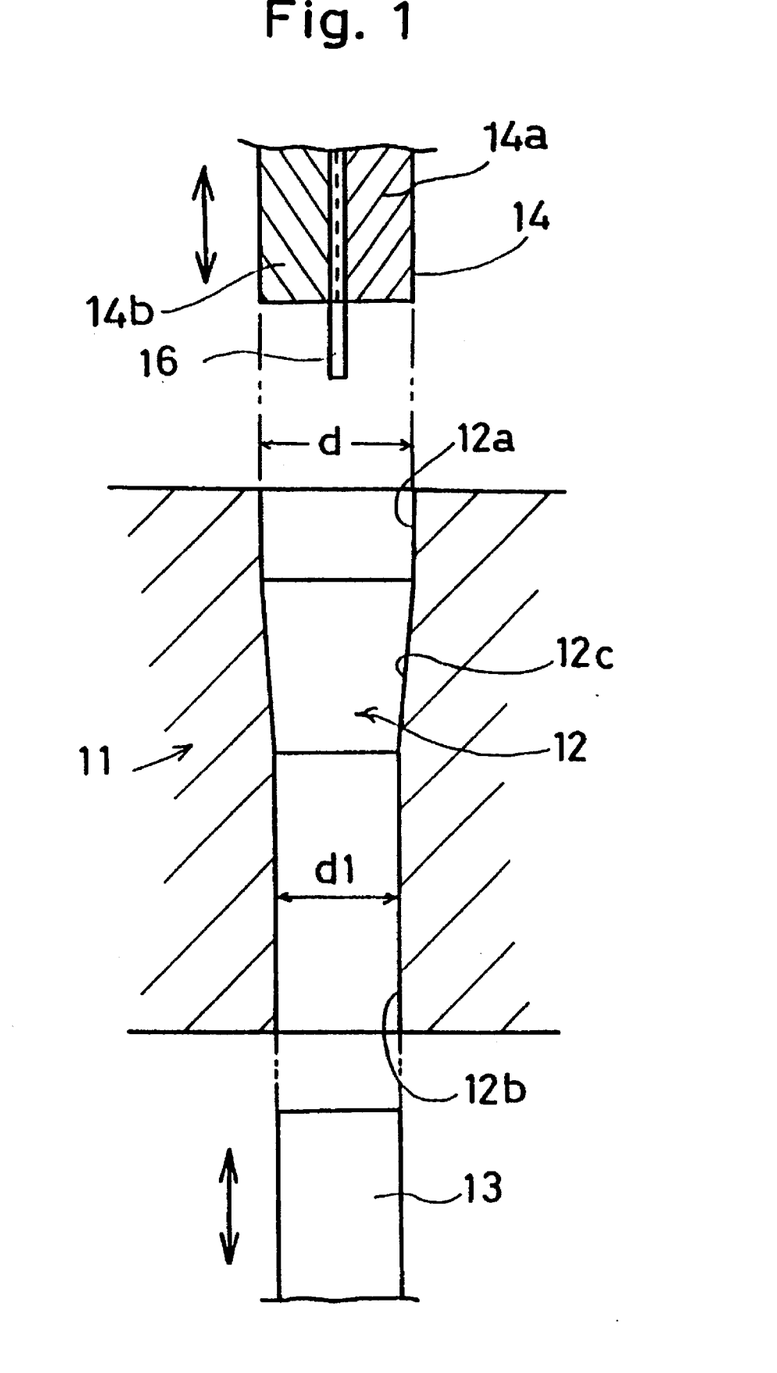
FIG. 1 is a view, in vertical section, showing a compacting device used for making a solid electrolytic capacitor according to a first embodiment of the present invention.

As shown in FIG. 1, the compacting device comprises a form 11 having a shaping bore 12, a lower (first) die 13, and an upper (second) die 14. Both of the dies 13, 14 are vertically movable into and out of the shaping bore 12 of the form 11.

The shaping bore 12 of the form 11, which may have a square cross section, includes a cross-sectionally larger inserting portion 12a and a cross-sectionally smaller inserting portion 12b. The shaping bore 12 further includes a tapered intermediate portion 12c which progressively reduces in cross-sectional area downwardly from the larger inserting portion 12a to the smaller inserting portion 12b. In FIG. 1, an inner dimension of the larger inserting portion 12a is represented by reference sign d, whereas that of the smaller inserting portion 2b is represented by reference sign d1.

The term "inner dimension" as used herein indicates a side length of a square if the shaping bore 12 has a square cross section. However, if the shaping bore 12 has a circular or ellipsoidal cross section, the same term "inner dimension" represents a diameter of a circle, or a longer or shorter axis of an ellipsoid. A similar interpretation should also apply to the term "outer dimension" used hereinafter.

The upper die 14 includes a pair of die halves 14a, 14b which holds a metal wire 16 (e.g.. tantalum wire) as an anode wire when held together. However, the die halves 14a are laterally separable from each other for releasing the wire 16 outside the form 11.

The solid electrolytic capacitor according to the first embodiment may be manufactured in the following manner.

Figure 2:
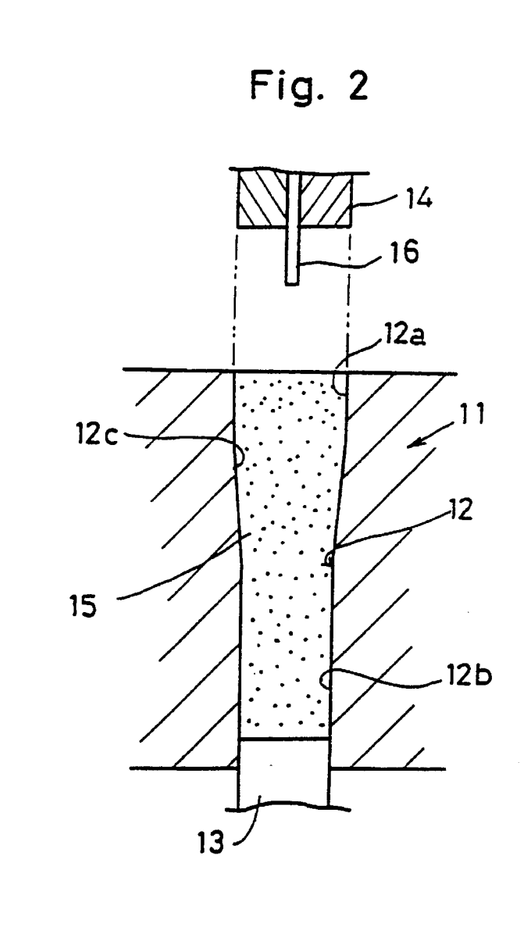
FIGS. 2 to 4 are views, in vertical section, showing successive steps of a compacting operation using the compacting device shown in FIG. 1.

First, as shown in FIG. 2, a predetermined amount of metal powder (particles) 15 is loaded into the shaping bore 12 of the form 11 with the lower die 13 slightly inserted into the shaping bore 12 from below.

Figure 3:
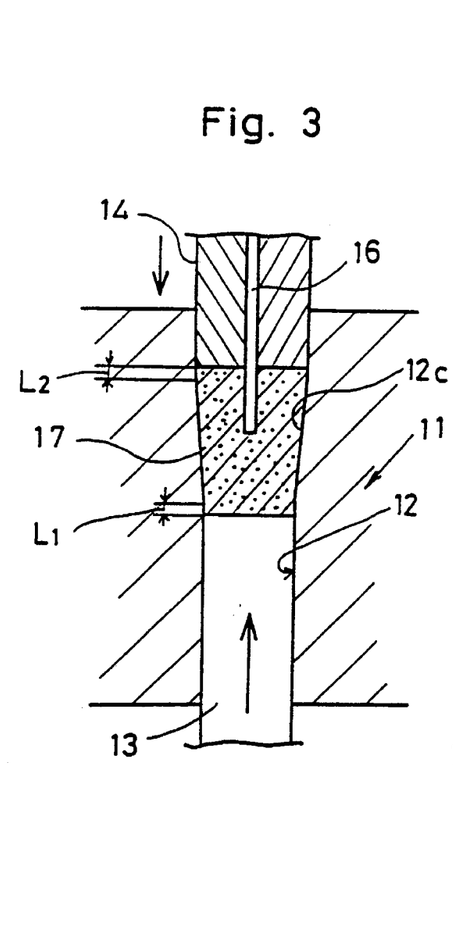

Then, as shown in FIG. 3, the upper die 14 holding the anode wire 16 is inserted downwardly into the shaping bore 12, whereas the lower die 13 is further advanced upwardly.

As a result, the metal powder is compacted into a porous chip 17 with the anode wire 16 partially inserted in and partially projecting from the chip 17.

Figure 4:
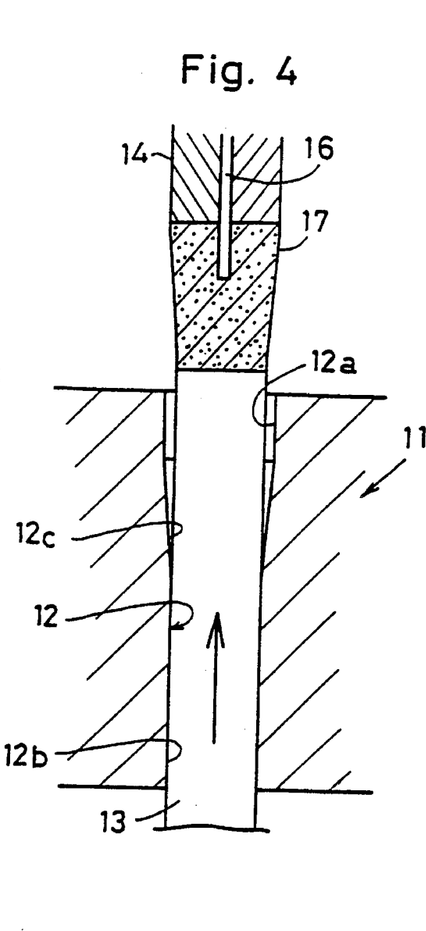

Then, as shown in FIG. 4, the upper die 14 is drawn upwardly out of the shaping bore 12 while the lower die 13 is additionally advanced upwardly past the shaping bore 12. As a result, the chip 17 is pushed out of the shaping bore 12.

Figure 5:
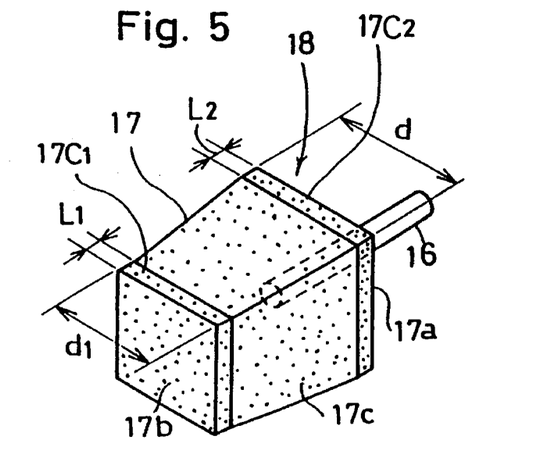
FIG. 5 is a perspective view showing a capacitor element obtained by the compacting operation.

FIG. 5 shows a capacitor element 18 obtained by the above-described compacting operation. The capacitor element 18 comprises a combination of the compacted porous chip 17 and the anode wire 16. The chip 17 has a tapered body 17c which progressively reduces in cross-sectional area from a cross-sectionally larger end 17a (having an outer dimension d) to a cross-sectionally smaller end 17b (having an outer dimension d1), in corresponding relation to the tapered intermediate portion 12c of the shaping bore 12.

At the time of compacting the metal powder (FIG. 3), the lower die 13 is preferably made to advance upwardly in the shaping bore 12 of the form 11 only up to a position short of the tapered intermediate portion 12c by an amount L1 which is provided as a tolerance. Thus, the cross-sectionally smaller end 17b (FIG. 5) of the chip 17 is made to have side surfaces 17C1 which are parallel to a central longitudinal axis 17d (see FIG. 6) of the chip 17.

If the lower die 13 is to be upwardly inserted into the shaping bore 12 up to the lower end of the tapered intermediate portion 12c at the time of compacting, the lower die 13 may be unexpectedly advanced slightly past the lower end of the tapered intermediate portion 12c due to a positioning error, consequently forming a wedge-like clearance between the lower die 13 and the tapered intermediate portion 12c. Obviously, such a wedge-like clearance will result in the formation of fins or burrs at the cross-sectionally smaller lower end of the compacted chip 17.

The above-described tolerance L1 prevents the lower die 13 from unexpectedly advancing into the tapered intermediate portion 12c of the shaping bore 12 even if there is a positioning error. Thus, it is possible to prevent the undesirable formation of fins or burrs at the cross-sectionally smaller lower end 17b (see FIG. 5) of the chip 17.

Further, at the time of compacting the metal powder (FIG. 3), the upper die 14 is preferably made to advance downwardly in the shaping bore 12 of the form 11 only up to a position short of the tapered intermediate portion 12c by an amount L2 which is provided as a tolerance. Thus, the cross-sectionally larger end 17a (FIG. 5) of the chip 17 is made to have side surfaces 17C2 which are parallel to the central longitudinal axis 17d of the chip 17.

Due to the above-described tolerance L2, the upper die is prevented from unexpectedly advancing into the tapered intermediate portion 12c of the shaping bore 12 even if there is a positioning error. Thus, it is possible to prevent the tapered intermediate portion 12c from being damaged by the upper die 14, which is required for prolonging the service life of the compacting device. Further, the tolerance L2 also prevents the formation of acute-angle edges (which are easily nicked), at the cross-sectionally larger end 17a of the compacted porous chip 17.

According to the first embodiment, moreover, the intermediate portion 12c (main compacting portion) of the shaping bore 12 is tapered downwardly, and the compacted porous chip 17 is pushed out upwardly. Thus, it is possible to prevent the chip 17 from being rubbed against the shaping bore 12 at the time of taking out the chip IV, thereby preventing the surfaces of the porous chip 17 from being clogged up by such rubbing even if the inner surfaces of the shaping bore 12 are roughened.

Apparently, the degree of rubbing increases as the degree of compaction increases. Therefore, it has been conventionally necessary to decrease the degree of compaction for lowering the degree of the rubbing. However, according to the first embodiment wherein no rubbing occurs at the time of taking out the porous chip 17 from the form 11, the chip 17 may be compacted to a higher degree than conventionally possible, thereby realizing an increased capacitance.

The porous chip 17 thus obtained is then subjected to sintering. Further, the sintered chip 17 is thereafter subjected to a step of forming a dielectric substance (e.g. tantalum pentoxide) in a conventional manner (FIG. 21), and another step of forming a solid electrolytic substance (e.g. manganese dioxide) again in a conventional manner (FIG. 22).

Figure 6:
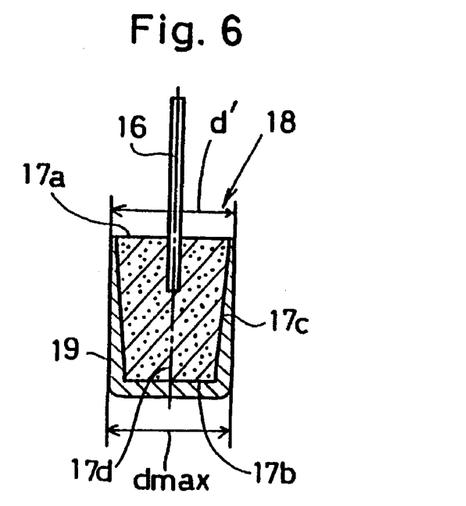
FIG. 6 is a view, in vertical section, showing the same capacitor element after forming a cathode layer.

Then, as shown in FIG. 6, the chip 17 thus treated is graphitized and metalized for forming a cathode layer 19 which covers the lateral surfaces of the tapered chip body 17c and the surface of the cross-sectionally smaller end 17b. At this time, the combined thickness of the cathode side layers (including the solid electrolyte layer, the cathode layer 19, and etc.) increases downwardly toward the cross-sectionally smaller end 17b, but such a thickness increase is offset totally or at least partially by the cross-sectional reduction of the tapered chip body 17c. Thus, an outer dimension dmax of the cathode layer 19 at the cross-sectionally smaller end 17b of the chip 17 can be rendered nearly equal to an outer dimension d' of the cathode layer 19 at the cross-sectionally larger end 17a, thereby eliminating or reducing downward flaring of the cathode layer 19 (compare FIGS. 6 and 23).

Figure 7:
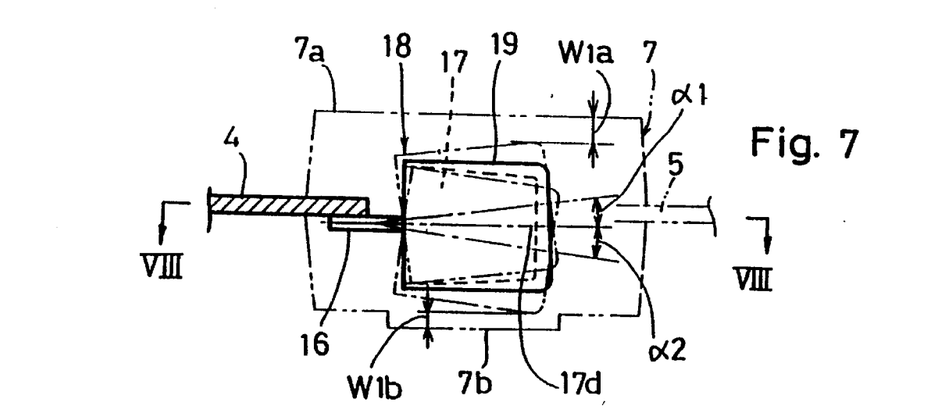
FIG. 7 is a front view, partially in section, showing the same capacitor element as enclosed in a resin package.
Figure 8:
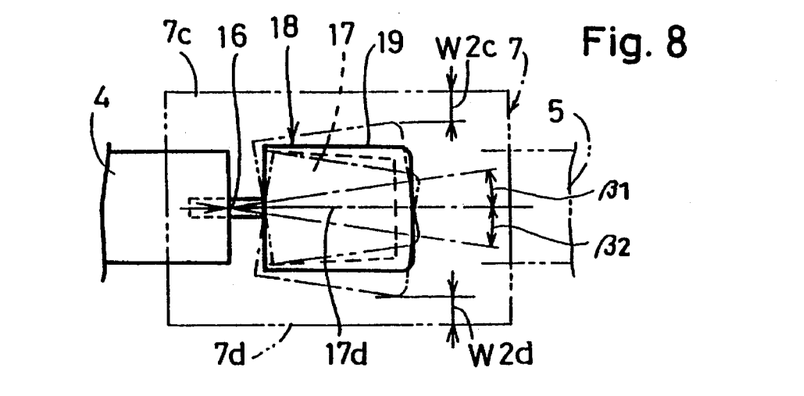
FIG. 8 is a plan view of the packaged capacitor element as seen in the direction of arrows VIII—VIII in FIG. 7.

The capacitor element 18 thus obtained may be used to constitute a package-type capacitor, as shown in FIGS. 7 and 8.

More specifically, the anode wire 16 is connected to an anode lead 4 by welding for example, whereas the cathode layer 19 is electrically connected to a cathode lead 5 directly (like FIGS. 17 and 18) or indirectly via an unillustrated safety fuse (like FIG. 19). Further, a resin package 7 is formed to enclose the capacitor element 18 together with part of the anode and cathode leads 4, 5.

At the time of connecting the anode wire 16 to the anode lead 4, the central longitudinal axis 17d of the chip 17 may be inclined upwardly or downwardly by an angle $\alpha 1$ or $\alpha 2$ (FIG. 7), and/or laterally by an angle $\beta 1$ or $\beta 2$ (FIG. 8), due to unintentional bending of the anode wire 16. However, since the tendency of the cathode layer 19 flaring in a direction away from the anode wire 16 is eliminated or reduced by the cross-sectional reduction of the tapered chip 17, the minimum wall thickness W1a, W1b, W2c or W2d of the resin package 7 at either of the four sides of the capacitor element 18 (i.e., four side surfaces 7a, 7b, 7c, 7d of the resin package 7) can be still kept at an acceptable level. Thus, it is possible to increase the entire volume of the chip 17 (as required for increasing the capacitance) without the need for enlarging the resin package 7, as compared with the prior art capacitor element shown in FIG. 23.

FIGS. 9 through 12 show a second embodiment of the present invention.

Figure 9:
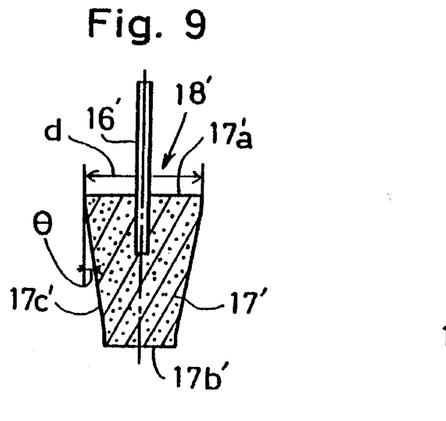
FIG. 9 is a view, in vertical section, showing a capacitor element for incorporation into a solid electrolytic capacitor according to a second embodiment of the present invention.
Figure 10:
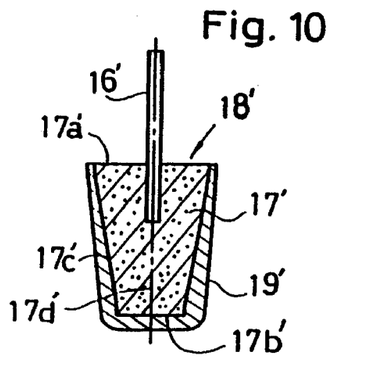
FIG. 10 is a view, in vertical section, showing the capacitor element of FIG. 9 after forming a cathode layer.

As shown in FIGS. 9 and 10, a capacitor element 18' according to the second embodiment comprises a porous chip 17' obtained by compacting a predetermined amount of metal powder, and an metal anode wire 16' partially embedded in and partially projecting from the chip 17'. The chip 17' has a tapered body 17c' which progressively reduces in cross-sectional area from a cross-sectionally larger end 17a' to a cross-sectionally smaller end 17b'. Further, a cathode layer 19' is formed for covering the cross-sectional smaller end 17b' and the side surfaces of the tapered chip body 17c'.

According to the second embodiment, the tapered chip body 17c' has such a large taper angle $\theta$ that the outer periphery of the cathode layer 19' also tapers in a direction away from the anode wire 16', as shown in FIG. 10.

Figure 11:
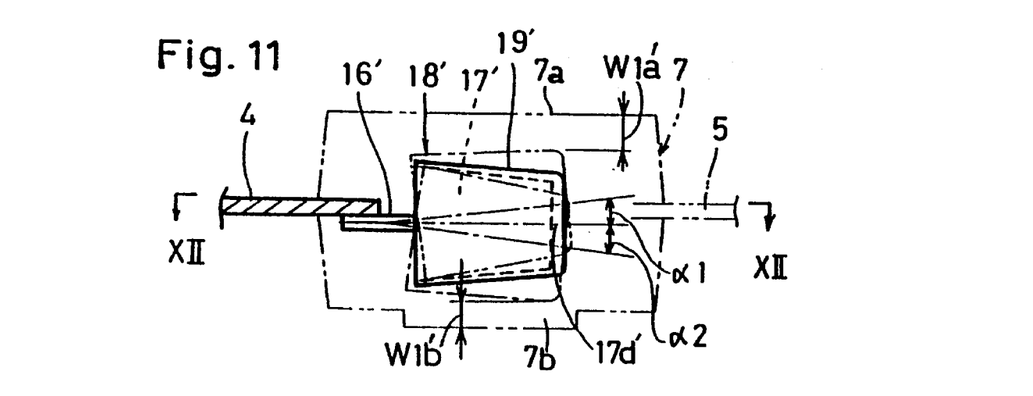
FIG. 11 is a front view, partially in section, showing the capacitor element of FIG. 9 as enclosed in a resin package.
Figure 12:
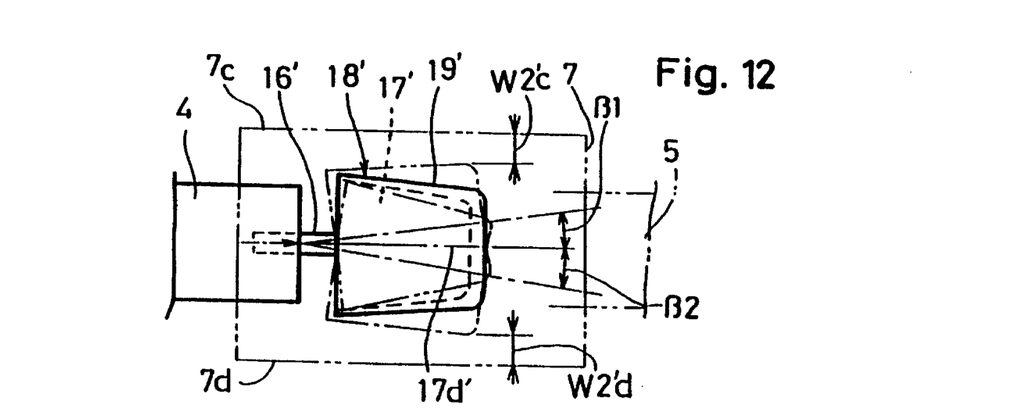
FIG. 12 is a plan view of the packaged capacitor element as seen in the direction of arrows XII—XII in FIG. 11.

The capacitor element 18' thus obtained may be used to constitute a package-type capacitor, as shown in FIGS. 11 and 12. Specifically, the anode wire 16' is connected to an anode lead 4 by welding for example, whereas the cathode layer 19' is electrically connected to a cathode lead 5 directly (like FIGS. 17 and 18) or indirectly via an unillustrated safety fuse (like FIG. 19). Further, a resin package 7 is formed to enclose the capacitor element 18' together with part of the anode and cathode leads 4, 5.

At the time of connecting the anode wire 16' to the anode lead 4, the central longitudinal axis 17d' of the chip 17' may be inclined upwardly or downwardly by an angle $\alpha 1$ or $\alpha 2$ (FIG. 11), and/or laterally by an angle $\beta 1$ or $\beta 2$ (FIG. 12), due to unintentional bending of the anode wire 16'. However, since the outer periphery of the cathode layer 19' tapers away from the anode wire 16', the minimum wall thickness W1a', W1b', W2c' or W2d' of the resin package 7 at either of the four sides of the capacitor element 18' can be still kept at an acceptable level.

Thus, it is possible to additionally increase the entire volume of the chip 17', as compared with the capacitor element 18 of the first embodiment shown in FIG. 6).

FIGS. 13 through 16 show a third embodiment of the present invention.

Figure 13:
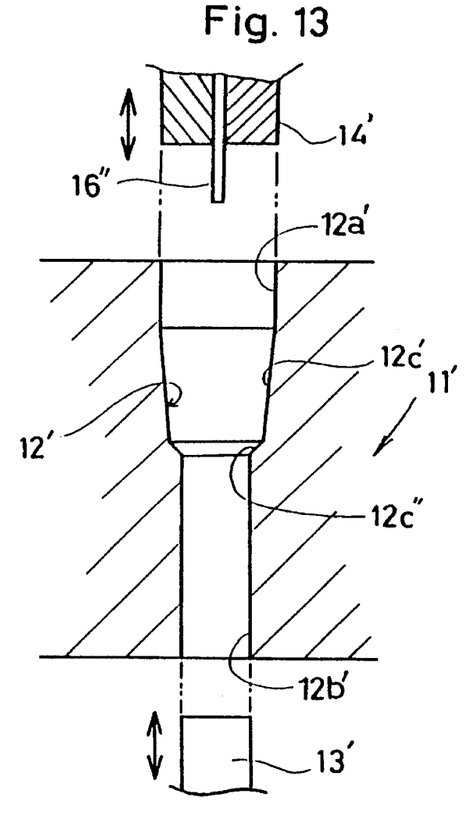
FIG. 13 is a view, in vertical section, showing a compacting device used for making a solid electrolytic capacitor according to a third embodiment of the present invention.

As shown in FIG. 13, a compacting device according to the third embodiment comprises a form 11' having a shaping bore 12', a lower (first) die 13' vertically insertable into the shaping bore 12' from below, and an upper (second) die 14' vertically insertable into the shaping bore 12' from above. Further, the upper die 14 is designed to removably hold a metal wire 16" as an anode wire.

The shaping bore 12' of the form 11' includes a cross-sectionally larger inserting portion 12a' and a cross-sectionally smaller inserting portion 12b'. The shaping bore 12' further includes a first tapered portion 12c' of a smaller taper angle closer to the cross-sectionally larger inserting portion 12a', and a second tapered portion 12b of a larger taper angle closer to the cross-sectionally smaller inserting portion 12b'.

Figure 14:
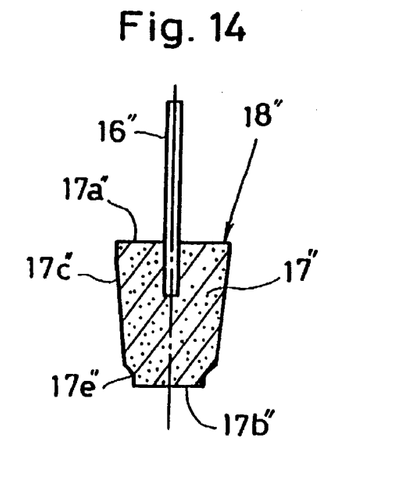
FIG. 14 is a view, in vertical section, showing a capacitor element made by the compacting device of FIG. 13.

As shown in FIG. 14, a capacitor element 18" obtained by using the compacting device of FIG. 13 comprises a porous chip 17" from which the anode wire 16" partially projects. The chip 17" has a tapered body 17c" which progressively reduces in cross-sectional area from a cross-sectionally larger end 17a" toward a cross-sectionally smaller end 17b". Further, the chip 17" also has a chambered portion 17e" at a position between the tapered body 17c" and the cross-sectionally smaller portion 17b". Obviously, the tapered body 17c" corresponds to the first tapered portion 12c' of the shaping bore 12', whereas the chambered portion 17e" corresponds to the second tapered portion 12c".

Figure 15:
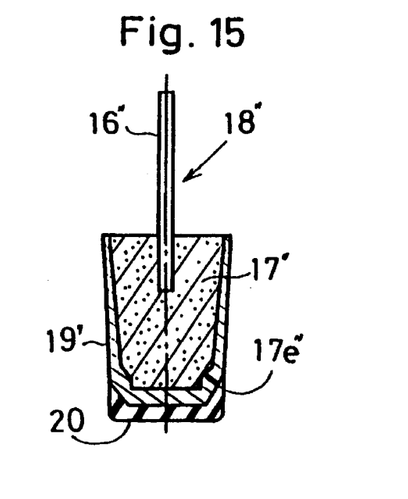
FIG. 15 is a view, in vertical section, showing the capacitor element of FIG. 14 after forming a cathode layer.

As shown in FIG. 15, a cathode layer 19" is formed for covering the cross-sectional smaller end 17b", the chambered portion 17e" and the side surfaces of the tapered chip body 17c". Further, an insulating resin layer 20 is formed on the cathode layer 19" only at the cross-sectionally smaller end 17b". It should be appreciated that, due to the presence of the chambered portion 17e", the insulating resin layer 20 is prevented from excessively bulging or projecting laterally beyond the side surfaces of the cathode layer 19".

Figure 16:
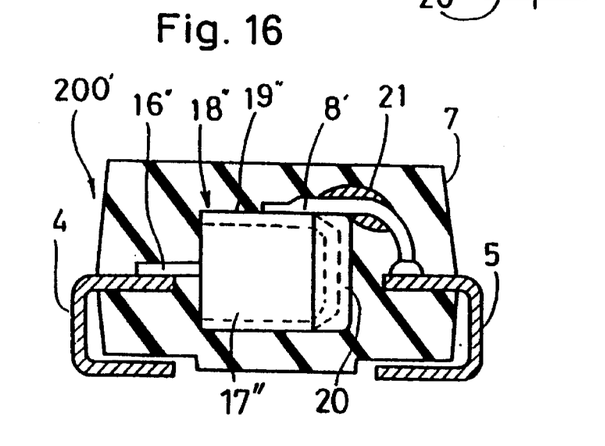
FIG. 16 is a front view, in vertical section, showing the capacitor element of FIG. 12 as enclosed in a resin package.

The capacitor element 18" thus obtained may be used to constitute a package-type capacitor 200', as shown in FIG.

16. More specifically, the anode wire 16" is connected to an anode lead 4 by welding for example, whereas the cathode layer 19" is electrically connected to a cathode lead 5 through a safety fuse 8' (overcurrent fuse for example) which is provided with an arc-extinguishing member 21 made of silicone resin for example. Further, a resin package 7 is formed to enclose the capacitor element 18" together with part of the anode and cathode leads 4, 5.

According to the arrangement of FIG. 16, the safety fuse 8' can be brought into intimate contact with the insulating resin layer 20 without electrically connecting thereto. Thus, the effective length of the fuse 8' can be increased by an amount corresponding to the contact length between the fuse 8' and the insulating resin layer 20. It should be appreciated here that the effective length of the fuse 8' need be made as long as possible for making the fuse sensitive to an overcurrent.

Further, since the chambered portion 17e" of the chip 17" eliminates or reduces lateral bulging of the insulating resin layer 20 beyond the side surfaces of the cathode layer 19", the safety fuse 8' is not made offset away from the capacitor element 18". Thus, it is possible to avoid the necessity of enlarging the wall thickness of the resin package 7 above the capacitor element 18".

According to the prior art arrangement shown in FIG. 19, by contrast, the safety fuse 8 need be elongated by bending it along an upwardly bulging path. Thus, the wall thickness R of the resin package 7 above the capacitor element 1 must be increased by an amount corresponding to the upwardly bulging amount S of the fuse 8. Further, the fuse 8 may unexpectedly shifts downward into additional contact with the cathode layer 6, thereby shortening the effective length of the fuse 8. Such disadvantages of the prior art are substantially eliminated by the arrangement shown in FIG. 15.

The preferred embodiments of the present invention being thus described, it is obvious that the same may be varied in many ways. For instance, the compacted porous chip 17, 17', 17" may be formed to have a circular, ellipsoidal or other cross-sectional shape. Further, the anode wire 16, 16', 16" may be replaced by a metal anode layer for direct electrical connection to the anode lead 4. Such variations are not to be regarded as a departure from the spirit and scope of the present invention, and all such modifications as would be obvious to those skilled in the art are intended to be included within the scope of the following claims.

I claim:

1. A capacitor element for a solid electrolytic capacitor comprising:

a sintered chip of metal powder, the chip having a first end and a second end opposite to the first end, the chip including a tapered body whose cross-sectional area reduces from the first end to the second end; and a cathode layer covering the chip excepting at least the first end;

wherein a combined body of the chip and the cathode layer is substantially constant in cross-section from the first end to the second end.

2. The capacitor element according to claim 1, further comprising an anode wire projecting from the first end of the chip.

3. The capacitor element according to claim 1, wherein the first end of the chip is rendered cross-sectionally constant for a predetermined length.

4. The capacitor element according to claim 1, wherein the second end of the chip is rendered cross-sectionally constant for a predetermined length.

\* \* \* \* \*